Feb. 2, 1965
M. H. BROOKS
3,167,871
SOUND THERAPY DEVICE
Filed May 1, 1962
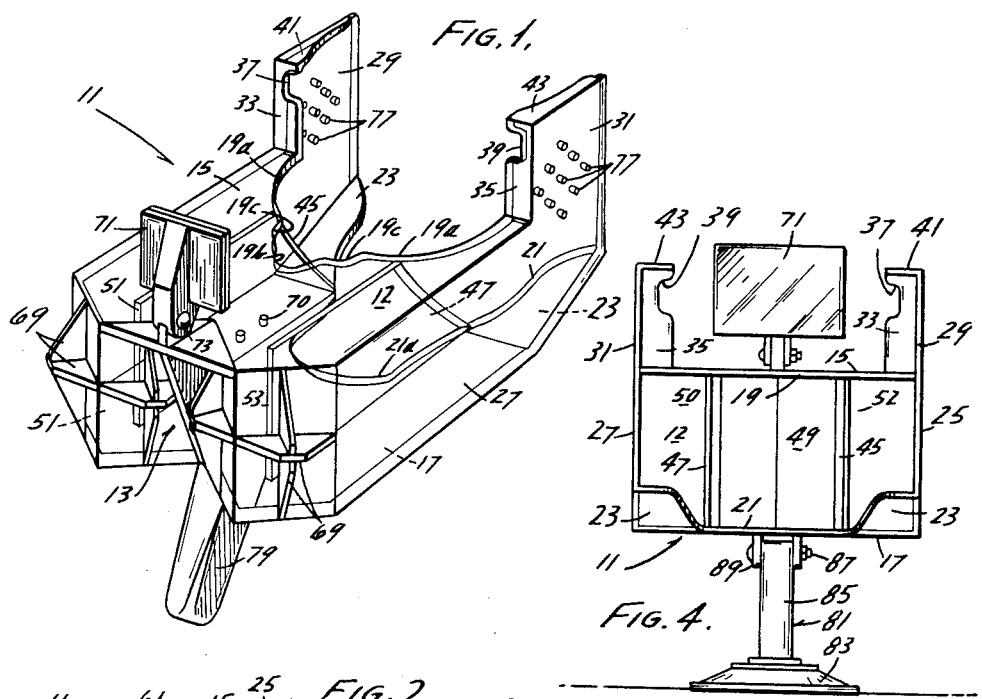
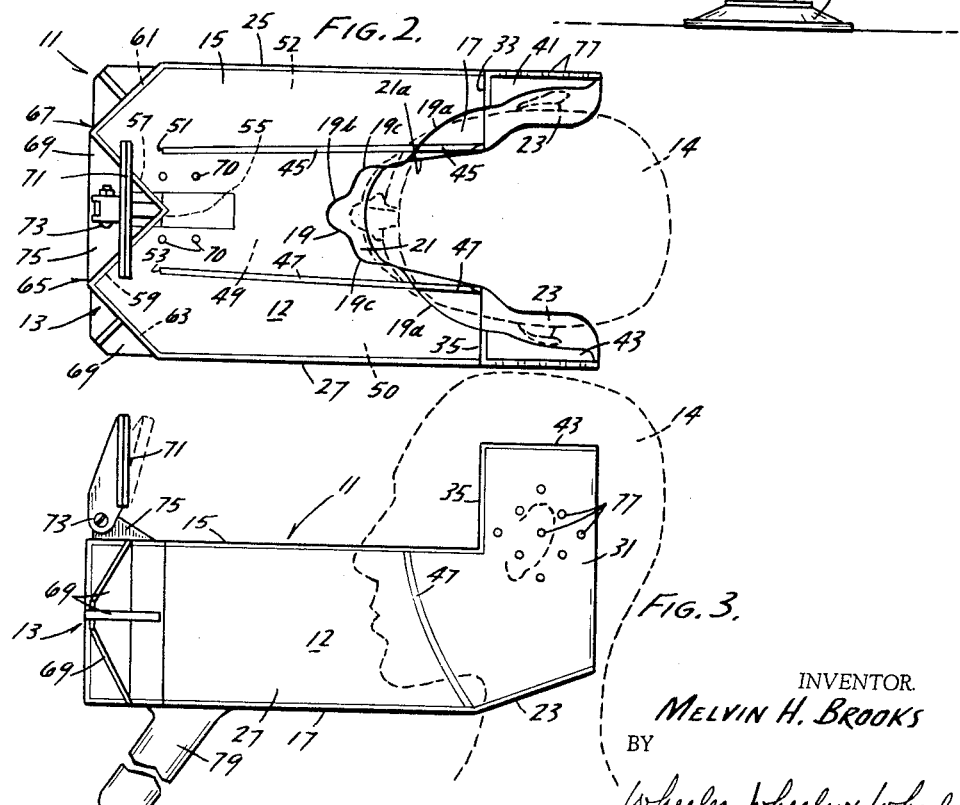
INVENTOR.
MELVIN H. BROOKS
BY
Wheeler, Wheeler & Wheeler
ATTORNEYS.

United States Patent Office 3,167,871
Patented Feb. 2, 1965

3,167,871
SOUND THERAPY DEVICE
Melvin H. Brooks, 2345-A N. 8th St., Milwaukee 6, Wis.
Filed May 1, 1962, Ser. No. 191,487
14 Claims. (Cl. 35—35)

The invention relates to speech development or therapy devices. More specifically, the invention relates to devices intended to permit a speaker to hear himself as others hear him.

Normally, one who speaks or talks does not hear himself as others hear him because the sounds emitted from his mouth are directed away from his ears and only arrive at his ears after having traversed the surrounding atmosphere. During such traversal, the true sound is distorted by the surrounding environment and is comingled with other sounds in the surrounding atmosphere. In the past, relatively expensive, electronically operable, high fidelity devices have been principally employed to permit a speaker to hear himself as others hear him, either by simultaneously reproducing the speaker's voice or by recording and then playing back the speaker's voice.

The invention provides a relatively simple and inexpensive device which conducts sound waves emitted from the speaker directly to the speaker's ears with substantially no distortion while generally excluding surrounding sound, thereby permitting the speaker to hear himself substantially as others do.

The device essentially comprises a box-like structure or housing which has a single open end and which is adapted to fit about the head of the user. The box-like structure is provided with means including sound directing wall surfaces and sound carrying passages for conducting sound emitted from the user's mouth directly to the user's ears.

Effective utilization of the disclosed device is greatly enhanced by permitting the user to observe his lip and mouth movement while listening to his speech, so as to permit better association of sounds with the lip and mouth movement which, at least in part, produces such sounds. Thus, the preferred embodiment of the device includes a mirror and a transparent wall portion located to permit the user to view his lip and mouth movement. Moreover, still more effective utilization of the disclosed device can be achieved by permitting an instructor to observe the user's or student's mouth and lip activity so that corrective instructions can be given to the student. Thus, the transparent wall portion is also desirably dimensioned to permit an instructor to observe the user or student. In addition, the box structure is desirably provided with means permitting the instructor to "feed" into the device instructions to the student or user, such as for example, properly formed sounds of instructions regarding lip and mouth formation.

Other objects and advantages of the invention will become known by reference to the following description and the accompanying drawings of the invention, in which:

FIGURE 1 is a perspective view of a device 11 embodying various of the features of the invention;

FIGURE 2 is a top plan view of the device;

FIGURE 3 is a side elevational view of the device; and

FIGURE 4 is an end elevational view of the device illustrating a modified form of mounting means.

The device 11 comprises a box-like structure or housing 12 which has a single open end adapted to receive portions of a user's head 14, whereby sounds spoken into the housing 12 by the user are directed to the ears of the user to enable the user to hear himself as others hear him. Specifically, the housing 12 includes a rear or end wall 13 which is spaced from the user's mouth when the device is in proper use and which is free of openings, and two pair of connected, opposing side walls which extend from the end wall 13 to define the single open end of the housing 12. One pair of the walls, i.e., the top and bottom walls 15 and 17 respectively, have generally concave free end margins 19 and 21 respectively. The free end margin 19 of the top wall 15 is adapted generally to conform to the user's face in the area generally above the bottom of the user's nose and is adapted to terminate forwardly of the user's ears. More specifically, the end margin 19 is relieved at 19a to receive the user's cheek, is notched or relieved at 19b to receive the bridge of the user's nose, and includes recesses 19c adapted to provide clearance for eyeglass rims should the user wear eyeglasses.

The bottom wall 17 extends from the end wall 13 generally beyond the free end margin 19 of the top wall 15 and its free end margin 21 is notched or relieved at 21a to receive the user's chin, and has two side portions 23 which are inclined upwardly, terminate rearwardly of the user's ears, and have curved edges generally adapted to conform to the user's neck.

The other pair of opposed walls constitute side walls 25 and 27 which are generally identical and extend between the top and bottom walls 15 and 17 from the end wall 13, including respective portions 29 and 31 extending from the inclined portions 23 of the bottom wall 17 upwardly beyond the top wall 15 in spaced covering relation to the user's ears.

The housing 12 also includes vertically extending wall segments 33 and 35 which project from the front vertical edges of the ear covering portions 29 and 31 and which are adapted to conform to the user's temples. The vertically extending wall segments 33 and 35 each preferably include respective notches 37 and 39 adapted for permitting passage of eyeglass temple bars. The housing 12 further includes horizontal wall segments 41 and 43 which extend from the top edge of the vertically extending wall segments 33 and 35 and from the top edge of the ear covering portions or shells 29 and 31, which horizontal wall segments include curved inner edges adapted to generally conform to the user's head in the area above the ears.

The housing 12 thus incorporates a single open end which is adapted to closely conform to the user's head so that sound waves emitted from the user's mouth are directed to the user's ears without distortion and without interference from outside noises.

Direction of the sound waves from the user's mouth to the user's ears is provided, in part, by a pair of spaced baffles 45 and 47 which extend within the housing 12 in generally parallel relation to the side walls 25 and 27 and which define a central sound transmitting passage 49 and a pair of side sound return passages 50 and 52. If desired, the baffles 45 and 47 can diverge slightly toward the user, as shown in FIGURE 2. More particularly, the baffles 45 and 47 extend between the top and bottom walls 15 and 17 and from adjacent the respective free end margins 19 and 21 of the top and bottom walls toward the end wall 13, terminating in respective ends or edges 51 and 53 located in spaced relation to the end wall 13 so as to co-operate therewith in permitting passage of sound waves around the ends of the baffles 45 and 47. The spacing between the top wall 15 and bottom wall 17 is such that the user's nose and mouth are both in the passage 49. There is ample room for the user's chin to move during sound utterance through the notch 21a. Thus, the sound of the voice is affected by sound waves coming from both the nose and the mouth.

Direction of the sound waves around the baffle ends 51 and 53 through the side passages 50 and 52, and to the user's ears is provided by the formation of the end wall 13. Specifically, the end wall 13 is constructed with suitable means for initially laterally outwardly deflecting sound waves transmitted through the central passage 49 and for subsequently deflecting such sound waves through the side passages 50 and 52 between the baffles 45 and 47 and the side walls 25 and 27 to the user's ears. Such means includes an end wall portion 55 (see FIGURE 2) projecting centrally into the central passage 49 and including wall surfaces 57 and 59 which diverge in the direction away from the baffle edges 51 and 53, thereby providing surfaces which are effective to deflect sound waves laterally outwardly.

Laterally outwardly of the baffles 45 and 47, the end wall 13 preferably includes wall surfaces 61 and 63 which diverge in the opposite direction to the surfaces 57 and 59, so as to deflect such laterally outwardly deflected sound waves toward the user's ears through the passages 50 and 52. In the preferred construction, two V shaped end wall portions 65 and 67 are employed. End wall portions providing wall surfaces of other configurations are possible. For instance, the end wall could include two semi-cylindrical portions.

Preferably, the V shaped portions of the end wall have an inclined angle of 90° and are each rigidified by ribs 69 to prevent vibration of the wall surfaces 57, 59, 61, and 63. However, if it is desired to increase the resonance of the sounds emitted by the user, the end wall, or one or more portions thereof, can be made more flexible by omitting the ribs 69 or can be made of relatively flexible material so as to provide one or more diaphragm portions.

In order to decrease excessive nasal resonance and to avoid sound distortion, there is preferably provided, in one or both of the top and bottom walls 15 and 17, one or more apertures permitting limited wave transmission therethrough. Thus, in the disclosed construction, two pairs of apertures 70, approximately 3/16" in diameter, are provided in both the top and bottom walls 15 and 17 in the area between the baffles 45 and 47 immediately in front of the projecting portion 55 of the end wall 13.

Maximum effectiveness of the disclosed device can be obtained by providing means whereby both an instructor or teacher and the user can observe the mouth and lip movement or activity of the user. Accordingly, the housing 12 is preferably constructed with at least one transparent portion permitting viewing of the user's mouth and lips. In the preferred embodiment, the housing 12 is constructed substantially entirely of transparent material, such as is commonly marketed under the trademark "Lucite," which, in addition to being transparent, is also sufficiently rigid to avoid unwanted vibration and any accompanying resonant condition.

Opportunity for the user to view his mouth and lip movement is provided by a mirror 71, means mounting the mirror to provide adjustment thereof to suit the user, and the before-mentioned transparent characteristic of at least a part of the top wall of the housing. In the preferred embodiment, the mirror 71 is adjustably mounted on a pintle 73 supported in a bracket 75 extending from the upper edge of the outer surface of the end wall 13.

In order to permit the instructor to provide oral direction to the user or student, the ear covering portions 29 and 31 of the side walls 25 and 27 are provided with aperture means. Thus, in the preferred embodiment, there is provided a series or pattern of relatively small openings 77, each approximately 3/16" in diameter, in each of the ear covering portions 29 and 31 of the side walls 25 and 27.

The housing 12 can be supported either manually by the user or the housing can be provided with a stand. In FIGURES 1 and 3, the housing is shown provided with a handle 79 extending fixedly from the under surface of the bottom wall 17, which handle permits the user to correctly position the open end of the housing in proper relation to the user's head. In FIGURE 4, the housing is shown pivotally mounted on a stand 81 incorporating a base 83 and an upright standard 85 which, at its free end, is provided with a pintle 87 engaged in a bracket 89 depending from the under surface of the bottom wall 17. Suitable means can be employed to adjustably fix the angular relation of the standard 85 to the housing 12.

In use, the housing 12 is positioned relative to the user's head so that the free margins 19 and 21 of the top and bottom walls 15 and 17 are closely positioned relative to the user's face and so that the ear shell portions 29 and 31 cover the user's ears. The mirror 71 is preferably adjusted so that the user can view his lips and mouth. The housing is held with its longitudinal axis in substantial alignment with the axis of sound waves propagating from the user's mouth, to prevent phase change and voice distortion. The user then speaks into the housing 12, emitting sound waves which pass between the baffles 45 and 47, striking against the end wall 13. Such striking results in re-direction of the sound waves back to the user's ears through the passages 50 and 52 between the baffles 45 and 47 and the side walls 25 and 27. As a result, the user hears himself as others hear him and is able to effectively associate lip and mouth movement with the sounds he hears. The transparent walls and the openings 77 permit the instructor to observe the mouth and lip movements of the user and to orally given instructions and encouragement to the user, thereby materially contributing to the effectiveness of the disclosed device.

An apparatus embodying the invention is of particular utility in analyzing speech disorders in retarded and aphasiac children, although it is useful wherever speech defects occur. Partially deaf users are particularly benefited because the device tends to amplify sounds. The user can detect such defects as vowel and consonant substitution, lip laziness, loss of high frequency projection, buccal whispers, cul-de-sac resonance (sometimes called "nasality"), errors in pitch, volume, quality, articulation and rhythm, etc. The apparatus is also useful in general speech development, in singing, and in voice and ear training in connection with learning foreign languages. The simultaneous feedback permits immediate experimentation and correction. Sounds appear to be amplified, thus any defects are amplified to be readily identified. The apparatus can readily be adapted for monaural feedback by omitting one of the ear shells, thus exposing one ear to room sounds and the other to voice feedback.

Various of the features of the invention are set forth in the following claims.

What is claimed is:

1. A device usable in sound therapy comprising a housing having
   an end wall,
   two pair of opposed walls extending from said end wall, one pair of said two pair of opposed walls constituting top and bottom walls and having free end margins adapted to be positioned in adjacent relation to the user's head, and the other pair of said two pair of opposed walls constituting side walls and having portions extending from said end margins of said top and bottom walls so as to be adapted to extend in covering relation to the ears of the user, and
   a pair of spaced baffles extending between said top and bottom walls in generally parallel relation to said side walls from positions in spaced relation to said end wall to adjacent the free end margins of said top and bottom walls, said baffles defining a central passage therebetween and side passages between said side walls and said baffles.

2. A device in accordance with claim 1 wherein said end wall includes
   means deflecting sound waves traveling thereto from the mouth of the user through said central passage for travel to the ears of the user through said side passages.

3. A device in accordance with claim 2 wherein said sound wave deflecting means includes
a portion projecting centrally inwardly of said central passage and having wall surface means for deflecting sound waves transversely outwardly toward said side walls.

4. A housing usable in speech development and having a single open end adapted for receiving the head of a user, said housing comprising
an end wall,
two pair of opposed walls extending from said end wall, one pair of said two pair of opposed walls constituting top and bottom walls and having free end margins adapted to extend to the user's head, the other pair of said two pair of opposed walls constituting side walls having portions extending from said end margins of said top and bottom walls so as to project in covering relation to the user's ears,
a transparent portion in at least one of said two pair of opposed walls, and
a mirror mounted on said housing in position to permit viewing by the user through said transparent portion of the user's lip and mouth.

5. A housing in accordance with claim 4 wherein said mirror is mounted on said housing by means for adjustably positioning said mirror relative to said housing.

6. A housing in accordance with claim 4 wherein said ear-covering portions of said side walls include apertures therein permitting transmission therethrough of oral directions by an instructor.

7. A housing in accordance with claim 6 wherein a pair of spaced baffles extend between said top and bottom walls in generally parallel relation to said side walls from positions in spaced relation to said end wall to adjacent the free end margins of said top and bottom walls, said baffles defining a central passage therebetween and side passages between said side walls and said baffles.

8. A housing in accordance with claim 7 wherein handle means is attached to said housing whereby said device can be gripped by the hand and positioned in proper relation to the user's head.

9. Sound therapy apparatus comprising a sound transmitting housing having
an open end fitting about the user's head,
a sound transmitting passage receiving the user's nose and mouth,
a sound return passage communicating with at least one of the user's ears,
a closed end remote from the user's head and having means for deflecting sound from said sound transmitting passage to the sound return passage,
and wall means between said passages for laterally separating one passage from the other except adjacent said closed end.

10. The apparatus of claim 9 in which the means for deflecting sound comprises a non-resonant reflector.

11. The apparatus of claim 9 in which the means for deflecting sound comprises a resonant reflector.

12. The apparatus of claim 9 in which said housing has a transparent top through which the user's mouth can be viewed, a mirror, and means mounting the mirror near the closed end of the housing and through which the user may view his mouth through said top.

13. The apparatus of claim 9 in which said housing is provided with vent openings for minimizing cul-de-sac resonance.

14. The apparatus of claim 9 in which said housing has ear shells about the user's ears, said shells having openings through which sounds from outside the housing are transmitted to the user's ears.

References Cited in the file of this patent
UNITED STATES PATENTS

| | | |
|---|---|---|
| D. 189,450 | Cousino | Dec. 20, 1960 |
| D. 193,343 | MacFarlane | Aug. 7, 1962 |
| 1,494,019 | Rasmussen | May 13, 1924 |
| 2,491,982 | Kincart | Dec. 20, 1949 |
| 2,844,212 | Hogan et al. | July 22, 1958 |